United States Patent [19]
Neese, Jr.

[11] Patent Number: 5,373,659
[45] Date of Patent: Dec. 20, 1994

[54] KITCHEN SINK SHAPED FISHING BOBBER

[76] Inventor: Clarence W. Neese, Jr., P.O. Box 1294, Lapine, Oreg. 97739

[21] Appl. No.: 69,191

[22] Filed: Jun. 1, 1993

[51] Int. Cl.⁵ ............................................. A01K 93/00
[52] U.S. Cl. ..................................... 43/44.94; 22/126
[58] Field of Search ........................... 43/44.93, 44.94; 446/153, 160; D22/126, 132, 145, 146; D23/284

[56] References Cited
U.S. PATENT DOCUMENTS

| | | | |
|---|---|---|---|
| D. 274,350 | 6/1984 | Schaaf | D22/132 |
| 2,863,254 | 12/1958 | Kercher | 43/44.94 |

FOREIGN PATENT DOCUMENTS 1371282 10/1974 United Kingdom ................. 446/160

*Primary Examiner*—Kurt C. Rowan

[57] ABSTRACT

A kitchen sink shaped fishing bobber for supporting a fishing line at a predetermined depth. The bobber may be removably secured to the fishing line by wrapping the fishing line around a coil spring that is attached to the bobber. The coil spring is shaped to accommodate a variety of different diameter fishing lines and also has a sliding attachment to further secure the fishing line to the bobber.

8 Claims, 4 Drawing Sheets

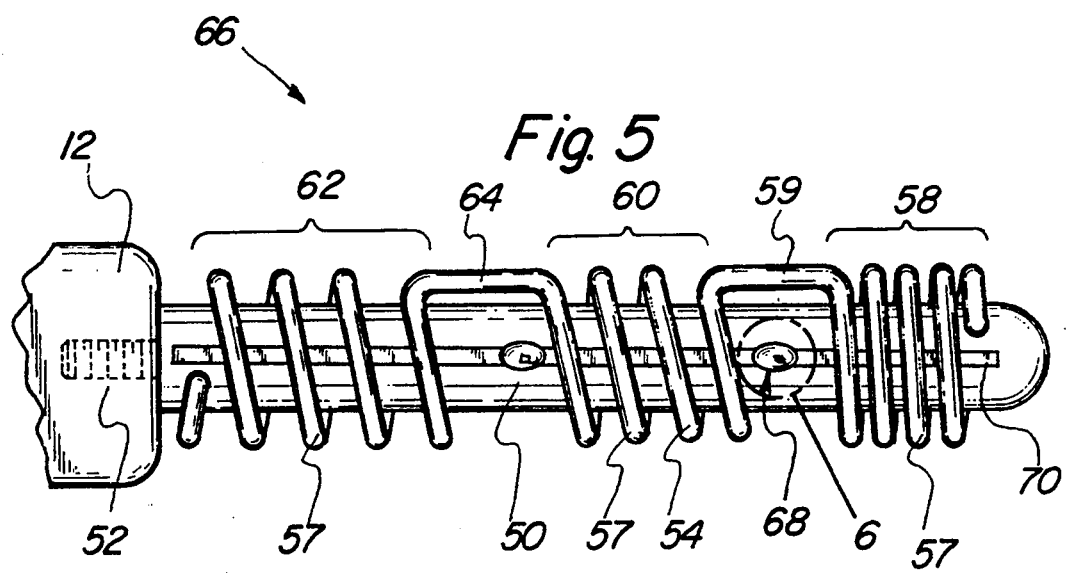
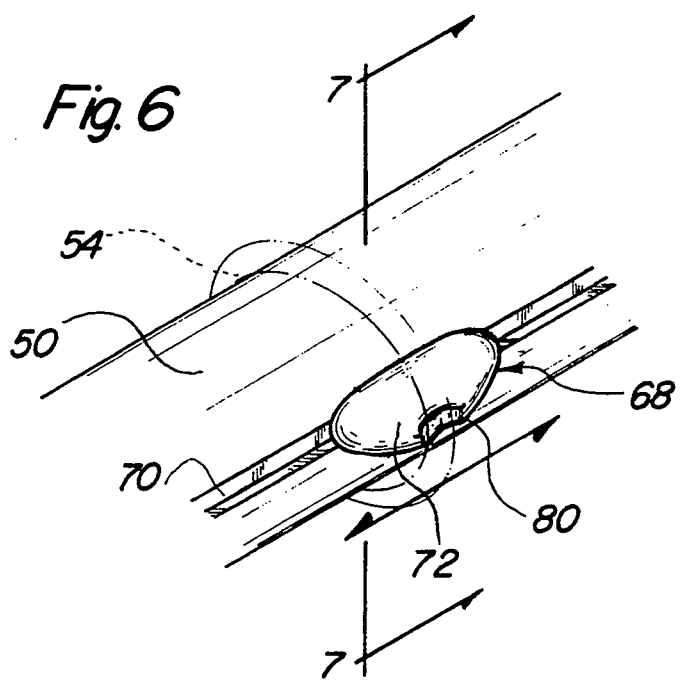

KITCHEN SINK SHAPED FISHING BOBBER

BACKGROUND OF THE INVENTION

1. Field of the Invention

The present invention relates to fishing bobbers and more particularly pertains to kitchen sink shaped fishing bobbers which may be utilized to support a fishing line at a predetermined depth.

2. Description of the Prior Art

The use of fishing bobbers is known in the prior art. More specifically, fishing bobbers heretofore devised and utilized for the purpose of supporting a fishing line at a predetermined depth are known to consist basically of familiar, expected and obvious structural configurations, notwithstanding the myriad of designs encompassed by the crowded prior art which have been developed for the fulfillment of countless objectives and requirements.

For example, U.S. Pat. No. 4,873,784 illustrates a disk shaped fishing line bobber that consists of a pair of disk-shaped members formed of a buoyant material which are held together in a juxtaposed position by a fastener so that a fishing line may wound thereabout.

A fishing bobber having a closed compartment for floatation and an open compartment for a containment of water ballast is illustrated in U.S. Pat. No. 4,809,461. This particular bobber may be attached to a fishing line by passing a loop of the fishing line through an aperture and hooking the loop onto a catch.

The patents mentioned heretofore are attachable to a fishing line by various means. A considerable amount of time is required by a user to attach some of the prior art fishing bobbers to a fishing line. It is therefore desirable for a fishing bobber to be quickly and securely attached to a fishing line without a fastidious effort.

Therefore, it can be appreciated that there exists a continuing need for a new kitchen sink shaped fishing bobber which can be utilized for supporting a fishing line at a predetermined depth and which may be removably secured to the fishing line by wrapping the fishing line around a coil spring that is attached to the bobber. In this regard, the present invention substantially fulfills this need.

SUMMARY OF THE INVENTION

In view of the foregoing disadvantages inherent in the known types of fishing bobbers now present in the prior art, the present invention provides a new kitchen sink shaped fishing bobber construction wherein the same can be utilized to support a fishing line at a predetermined depth and which may be removably secured to the fishing line by wrapping the fishing line around a coil spring attached to the bobber. As such, the general purpose of the present invention, which will be described subsequently in greater detail, is to provide a new kitchen sink shaped fishing bobber apparatus which has many of the advantages of the fishing bobbers mentioned heretofore and many novel features that result in a kitchen sink shaped fishing bobber which is not anticipated, rendered obvious, suggested, or even implied by any of the prior art fishing bobbers, either alone or in any combination thereof.

To attain this, the present invention essentially comprises a kitchen sink shaped fishing bobber for supporting a fishing line at a predetermined depth. The bobber may be removably secured to the fishing line by wrapping the fishing line around a coil spring that is attached to the bobber. The coil spring is shaped to accommodate a variety of different diameter fishing lines and also has a sliding attachment to further secure the fishing line to the bobber.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new kitchen sink shaped fishing bobber apparatus and method which has many of the advantages of the fishing bobbers mentioned heretofore and many novel features that result in a kitchen sink shaped fishing bobber which is not anticipated, rendered obvious, suggested, or even implied by any of the prior art fishing bobbers, either alone or in any combination thereof.

It is another object of the present invention to provide a new kitchen sink shaped fishing bobber which may be easily and efficiently manufactured and marketed.

It is a further object of the present invention to provide a new kitchen sink shaped fishing bobber which is of a durable and reliable construction.

An even further object of the present invention is to provide a new kitchen sink shaped fishing bobber which is susceptible of a low cost of manufacture with regard to both materials and labor, and which accordingly is then susceptible of low prices of sale to the consuming public, thereby making such kitchen sink shaped fishing bobbers economically available to the buying public.

Still yet another object of the present invention is to provide a new kitchen sink shaped fishing bobber which provides in the apparatuses and methods of the prior art some of the advantages thereof, while simultaneously overcoming some of the disadvantages normally associated therewith.

Still another object of the present invention is to provide a new kitchen sink shaped fishing bobber which may be removably secured to the fishing line by wrapping the fishing line around a coil spring that is attached to the bobber.

Yet another object of the present invention is to provide a new kitchen sink shaped fishing bobber which will accommodate a variety of different diameter fishing lines.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an enlarged view of a portion of a third embodiment of the invention.

FIG. 6 is an enlarged perspective view of a portion of the third embodiment.

DESCRIPTION OF THE PREFERRED EMBODIMENTS

Figure 1:
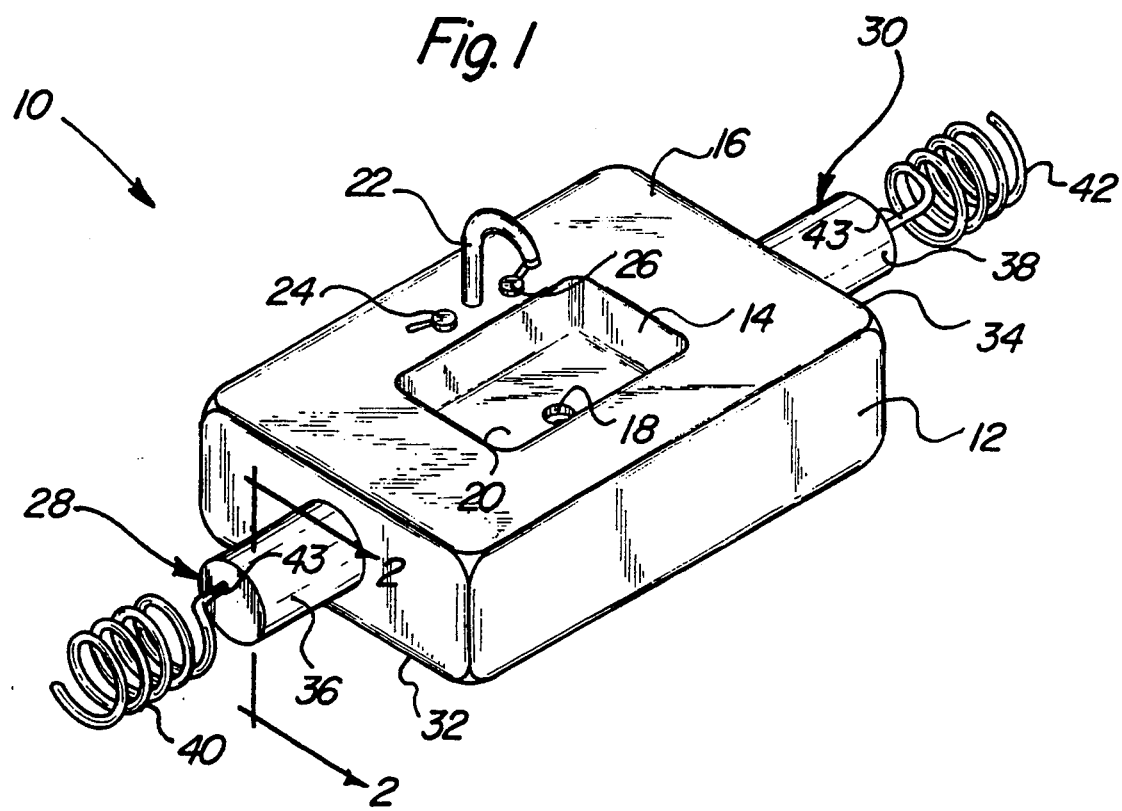
FIG. 1 is a perspective view of a kitchen sink shaped fishing bobber comprising the present invention.
Figure 2:
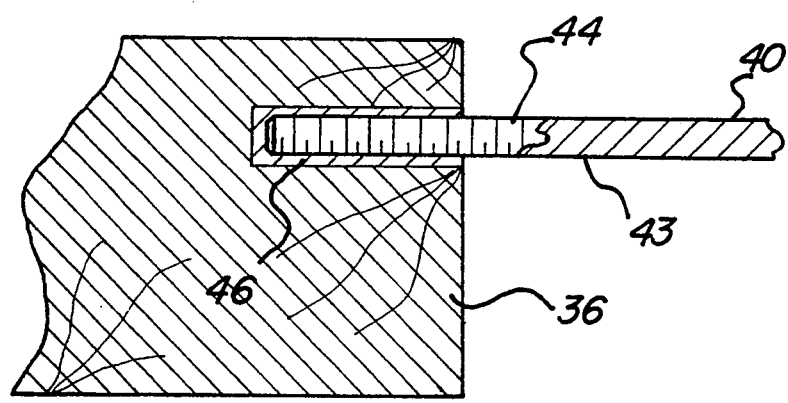
FIG. 2 is a cross section view taken along line 2—2 of FIG. 1.

With reference now to the drawings, and in particular to FIGS. 1-2 thereof, a first embodiment of a new kitchen sink shaped fishing bobber embodying the principles and concepts of the present invention and generally designated by the reference numeral 10 will be described.

More specifically, it will be noted that the kitchen sink shaped fishing bobber 10 comprises a substantially block-shaped floating body 12 that is formed in a manner so as to define an enclosed volume with a specific gravity of less than one. The floating body 12 includes a substantially rectangularly shaped depression 14 on a top side 16 that substantially resembles the form and shape of a kitchen sink. A cylindrically shaped depression 18 is located in a bottom area 20 of the rectangularly shaped depression which substantially resembles a conventional drain. A water faucet 22, and a pair of faucet handles 24, 26 are also mounted proximate the rectangularly shaped depression 14 of the floating body 12.

To facilitate an attachment of the kitchen sink shaped fishing bobber 10 to a fishing line, a first attachment assembly 28 and a second attachment assembly 30 are secured to the floating body 12. The first and second attachment assemblies 28, 30 are substantially similar in shape and each attachment assembly is connected to a respectively opposed side 32, 34. Although two attachment assemblies are fastened to the floating body 12, at least one attachment assembly may be utilized to secure the fishing bobber 10 to a fishing line.

The attachment assemblies 28, 30 each comprise a respective pair of dowels 36, 38 that are fixedly secured to the floating body 12 by any conventional fastening means. The dowels 36, 38 project out from their respective sides 32, 34 and each dowel supports one of a pair of coil springs 40, 42 thereon. The coil springs 40, 42 are substantially helical in shape and are formed out of a strand of a substantially resilient material. A threaded area 44 is located at an end 43 of each of the coil springs 40, 42 to facilitate the threaded securement of each spring to threads 46 of each respective dowel 36, 38 as best illustrated in FIG. 2.

Figure 3:
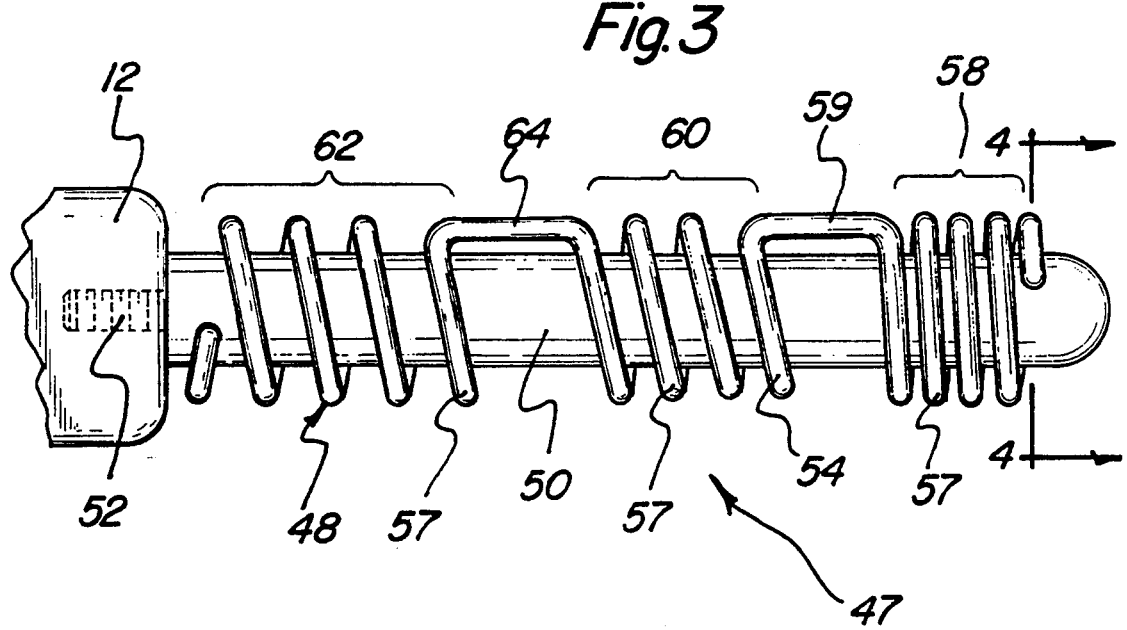
FIG. 3 is an enlarged view of a portion of a second embodiment of the present invention.
Figure 4:
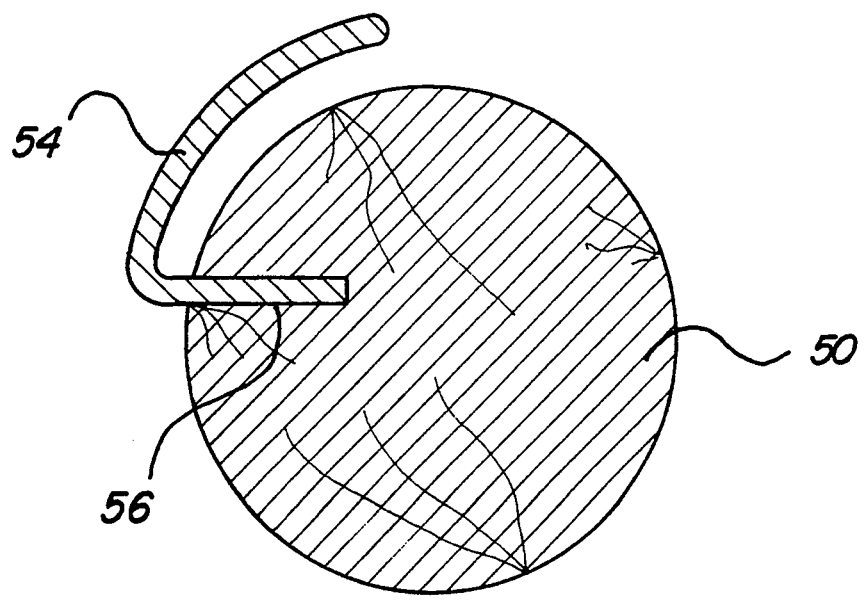
FIG. 4 is a cross section view taken along line 4—4 of FIG. 3.

A second embodiment 47 comprises substantially all of the features mentioned in the foregoing embodiment 10 and further comprises at least one attachment assembly 48 as shown in FIGS. 3–4. The attachment assembly 48 comprises a dowel 50 that is coupled to the floating body 12 by any fastening means such as a stud 52. The dowel 50 supports a coil spring 54 thereon by allowing an end 56 of the coil spring to penetrate and frictionally engage the dowel 50. An adhesive or any other securing enhancement means may be used to further secure the coil spring 54 to the dowel 50.

The coil spring 54 is shaped in such a manner so as to define a plurality of coils 57 and a plurality of distinct helical shaped regions 58, 60, and 62. A first region 58 has a substantially small spacing between each of the plurality of coils 57 of the spring 54. Connected to the first region 58 by a length of spring 59 is a second region 60 that has a substantially moderate spacing between each of the plurality of coils 57 of the spring 54. A third region 62 having a substantially ample spacing between each of the plurality of coils 57 of the spring 54 is connected to the second region 60 by a further length of spring 64. The plurality of regions 58, 60, and 62 are each separably operable to selectively engage and secure a variety of different diameter fishing lines thereto in a readily apparent manner.

A third embodiment 66 comprises substantially all of the features mentioned in the foregoing embodiments 10, 47 and further comprises at least one sliding clip 68 which may be utilized to further secure a fishing line to the attachment assembly 48. The sliding clip 68, as best illustrated in FIGS. 5–8, is slidably, partially disposed within a journal 70 of the dowel 50. The clip 68 is operable to be selectively positioned by a user between the spring 54 and the dowel 50 so as to bias a portion (not shown) of the spring against the dowel, thereby capturing a fishing line therebetween.

Figure 7:
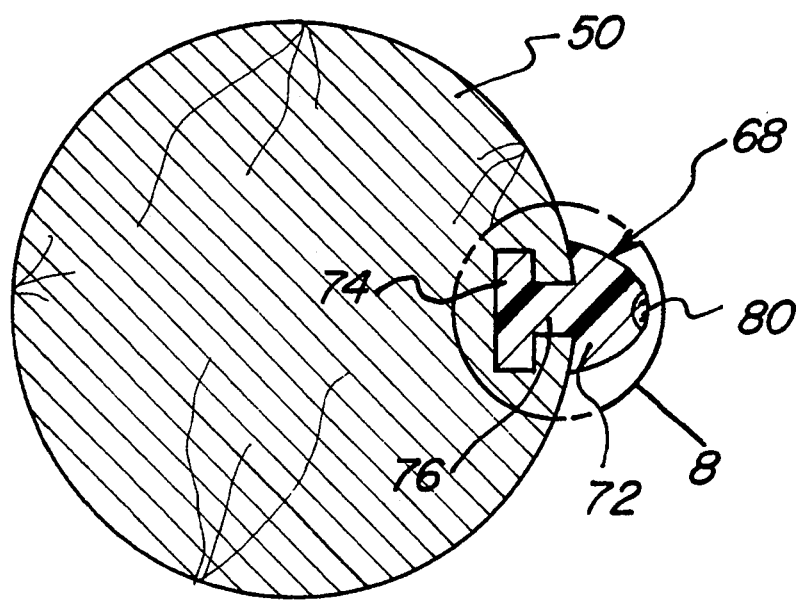
FIG. 7 is a cross section view taken along line 7—7 of FIG. 6.
Figure 8:
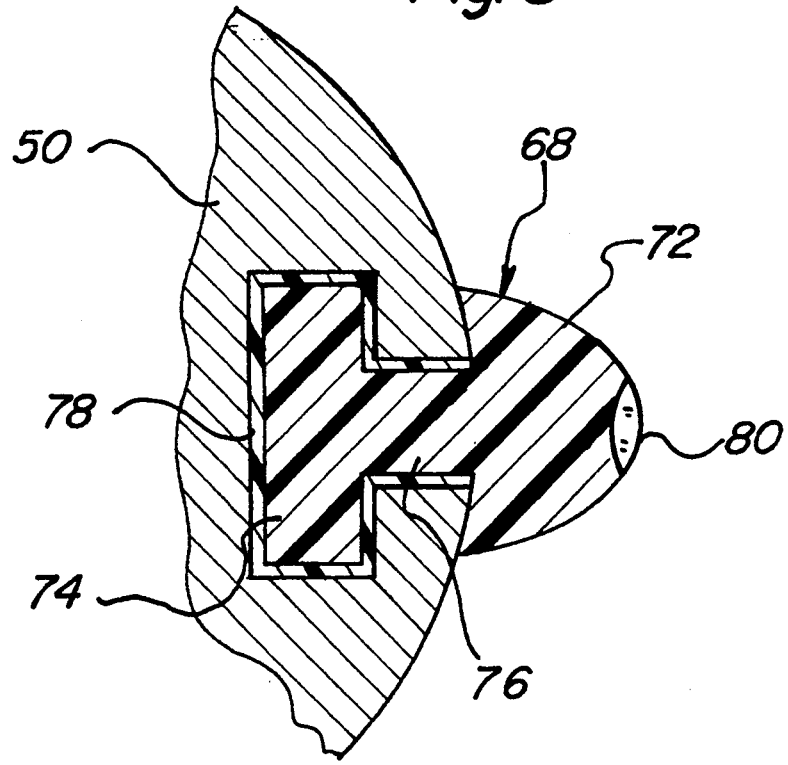
FIG. 8 is a enlarged view of a portion of the present invention as shown in area 8 of FIG. 7.

The clip 68 comprises a digit engaging member 72 and a journal member 74 that are integrally secured together by a connector 76, whereby the journal member may be captured by the journal 70 and the digit engaging member may be positioned outside of the journal as best shown in FIG. 7. The journal member 74 is supported within the journal 70 by a layer 78 of substantially solid lubricating material such as a fluorocarbon polymer or the like to permit the clip 68 to freely slide within the journal 70. The clip 68 further comprises a groove 80 that is operable to partially capture the spring 54 when the clip is positioned under the spring, thereby retaining the clip thereunder.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new kitchen sink shaped fishing bobber for a fishing line comprising:
    a substantially block-shaped member forming a buoyant body;
    a depression in said buoyant body, said depression being substantially rectangular in form;
    a faucet like member secured to said buoyant body proximate said depression; and
    a securing means whereby said bobber may be selectively secured to a fishing line.

2. The new kitchen sink shaped fishing bobber of claim 1, wherein said securing means comprises a coil spring, said coil spring being coupled to said bobber, whereby said fishing line may be selectively wrapped around said coil spring to secure said fishing line thereto.

3. The new kitchen sink shaped fishing bobber of claim 2, wherein said coil spring comprises a helically shaped wire having a plurality of coils and a distance between each of said plurality of coils.

4. The new kitchen sink shaped fishing bobber of claim 3 wherein a length of said distance varies along a length of said coil spring.

5. The new kitchen sink shaped fishing bobber of claim 4 and further comprising a dowel, said dowel being coupled to said bobber and passing through a center of said spring.

6. The new kitchen sink shaped fishing bobber of claim 5 and further comprising a journal in said dowel, and a clip, said clip being slidably supported partially within said journal whereby said clip may traverse said journal and engage said coil spring to capture said fishing line between said coil spring and said dowel.

7. The new kitchen sink shaped fishing bobber of claim 6 and further comprising a lubricant disposed within said journal for lubricating said clip.

8. The new kitchen sink shaped fishing bobber of claim 1 and further comprising a pair of handles secured to said buoyant body proximate said depression.

* * * * *